(12) United States Patent
Ishikawa et al.

(10) Patent No.: US 7,381,107 B2
(45) Date of Patent: Jun. 3, 2008

(54) OUTBOARD MOTOR

(75) Inventors: Takeshi Ishikawa, Wako (JP);
Yoshihisa Hirose, Wako (JP); Akiko Ichikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/509,543

(22) Filed: Aug. 24, 2006

(65) Prior Publication Data

US 2007/0068163 A1 Mar. 29, 2007

(30) Foreign Application Priority Data

Sep. 9, 2005 (JP) ............................. 2005-261659

(51) Int. Cl.
*B60L 11/00* (2006.01)
(52) U.S. Cl. .............................. 440/6; 440/3
(58) Field of Classification Search .................... 440/3, 440/6, 83, 86
See application file for complete search history.

(56) References Cited

U.S. PATENT DOCUMENTS 3,230,698 A * 1/1966 Nettles .......................... 440/6
3,703,642 A * 11/1972 Balaguer ....................... 440/6
7,195,525 B2 * 3/2007 Watabe et al. ................. 440/6
2006/0025025 A1 * 2/2006 Kitani et al. .................... 440/6

FOREIGN PATENT DOCUMENTS

JP 59-230894 12/1984

* cited by examiner

*Primary Examiner*—Lars A. Olson
(74) *Attorney, Agent, or Firm*—Carrier, Blackman & Associates, P.C.; William D. Blackman; Joseph P. Carrier

(57) ABSTRACT

In a hybrid outboard motor equipped with an internal combustion engine and electric motor as selective sources of power for driving the propeller and further provided with the first output shaft connected to the engine for transmitting its output to the propeller and the second output shaft connected to the motor for transmitting its output to the propeller, the first and second output shafts are disposed coaxially, so that the amount of space required for installing the shafts is smaller by the length of their coaxial portion relative to the prior art in which the shafts are simply connected in tandem. As a result, the size and weight of the outboard motors can be reduced, thereby enhancing its ease of operation and portability.

6 Claims, 3 Drawing Sheets

OUTBOARD MOTOR

BACKGROUND OF THE INVENTION

1. Field of the Invention

This invention relates to an outboard motor, particularly to an outboard motor equipped with both an internal combustion engine and an electric motor for driving the propeller, namely, a hybrid outboard motor.

2. Description of the Related Art

The hybrid outboard motor is a well-known type of outboard motor that has two sources of power for driving the propeller, an internal combustion engine and an electric motor. As taught by Japanese Laid-Open Patent Application No. Sho 59(1984)-230894 (particularly page 2, upper left column, lines 9 to 13, and FIG. 1), for example, the hybrid outboard motor is typically equipped with a first output shaft connected to the engine for transmitting its output to the propeller and a second output shaft connected to the motor for transmitting its output to the propeller, and the first and second output shafts are simply connected in tandem.

From the viewpoint of operating ease and portability, an outboard motor is preferably small and light in weight. However, the configuration taught by the reference does not enable adequate size and weight reduction because the space occupied by the first and second output shafts is proportional to their combined lengths.

SUMMARY OF THE INVENTION

An object of this invention is therefore to overcome the drawback of the prior art by providing an outboard motor reduced in size and weight that offers better operating ease and portability.

In order to achieve the object, this invention provides an outboard motor mounted on a stem of a boat and having an internal combustion engine and an electric motor as selective sources of power for driving a propeller, comprising: a first output shaft connected to the engine for transmitting output of the engine to the propeller; and a second output shaft connected to the motor for transmitting output of the motor to the propeller, the second output shaft being disposed coaxially with the first output shaft.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Outboard motors according to preferred embodiments of the present invention will now be explained with reference to the attached drawings.

Figure 1:
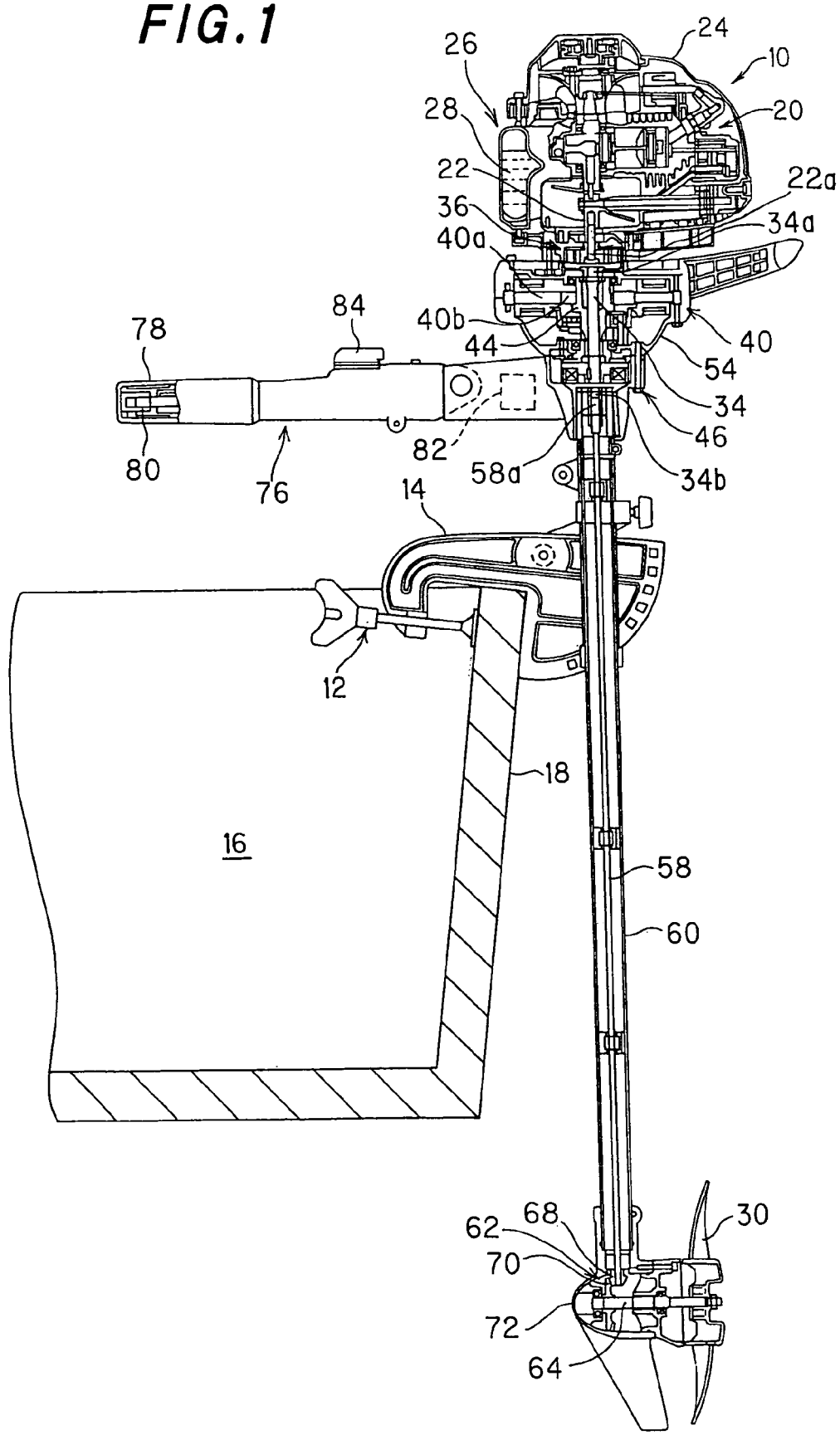
FIG. 1 is a partially sectional view of an outboard motor according to a first embodiment of the present invention.

FIG. 1 is a partially sectional view of an outboard motor according to one preferred embodiment.

The outboard motor, designated by the reference numeral 10 in FIG. 1, is mounted on the transom 18 of a boat (hull) 16 by means of a pair of stem brackets 14 (only one visible in FIG. 1) equipped with screw-type clamping devices 12.

As shown in FIG. 1, the outboard motor 10 is equipped with an internal combustion engine (power source) 20 located at its upper portion in the gravitational direction. The engine 20 is a single-cylinder gasoline engine having a displacement of around 50 cc and an output of 1.5 kW (approx. 2 PS). The engine 20 is installed vertically so that its crankshaft 22 lies parallel to the gravitational direction. Both the engine 20 and crankshaft 22 are enclosed within an engine cover 24.

A fuel tank 26 is installed near the engine 20 for supplying fuel (gasoline fuel) 28 to the engine. A propeller 30 installed at the lowermost part of the outboard motor 10 is driven by the engine 20.

Figure 2:
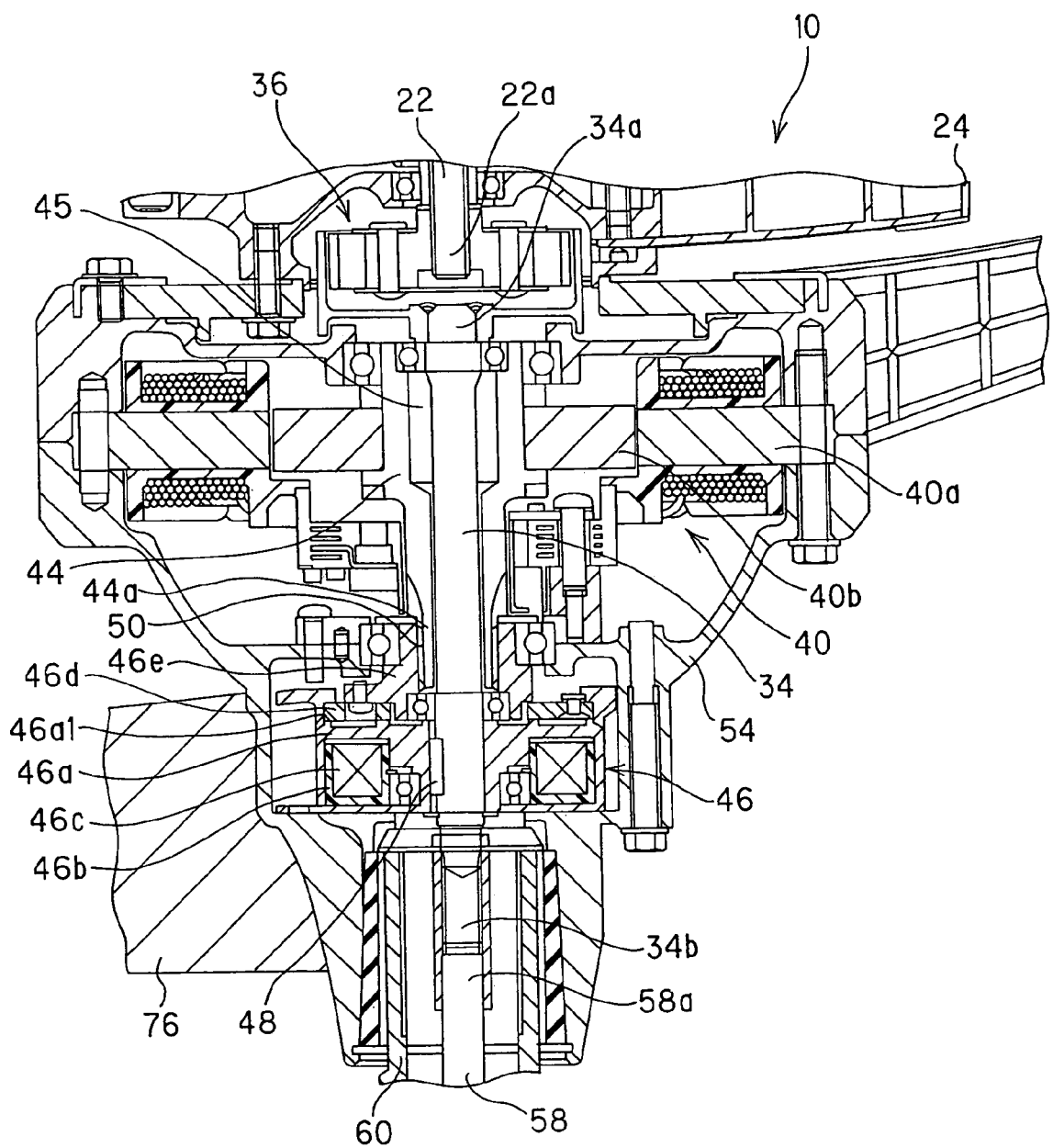
FIG. 2 is an enlarged sectional view of the region below a crankshaft shown in FIG. 1.

FIG. 2 is an enlarged sectional view of the region below the crankshaft 22 shown in FIG. 1.

A first output shaft 34 for transmitting the output (rotational output) of the engine 20 to the propeller 30 is vertically mounted below the crankshaft 22 to be rotatable around an axis extending in the gravitational direction. A clutch, more precisely centrifugal clutch 36 for enabling and disabling the transmission of the output of the engine 20 to the propeller 30 is installed between the crankshaft 22 and first output shaft 34. Specifically, the lower end 22a of the crankshaft 22 and the upper end 34a of the first output shaft 34 are interconnected through the centrifugal clutch 36. A clutch spring (not shown) of the centrifugal clutch 36 is designed to connect or couple the crankshaft 22 with the first output shaft 34 when the speed of the engine 20 exceeds a predetermined speed (e.g., idle speed).

An electric motor (power source; generator-motor) 40 is installed in the outboard motor 10 below the engine 20 and centrifugal clutch 36. The motor 40 is a DC brushless motor comprising a stator 40a and a rotor 40b that is supplied with voltage from a battery (not shown) and produces an output of several hundred Watts. A second output shaft 44 for transmitting the output (rotational output) of the motor 40 to the propeller 30 is connected to the inner periphery of the rotor 40b. As mentioned above, the outboard motor 10 is a relatively small size hybrid unit, which is equipped with the engine 20 and motor 40 as drive power sources of the propeller 30.

The second output shaft 44 is mounted vertically to be rotatable around an axis extending in the gravitational direction. It is fabricated to have a hollow interior constituting a generally cylindrical internal space or void 45 of a diameter slightly larger than that of the first output shaft 34.

The first output shaft 34 is disposed in the space 45 to be concentric with the second output shaft 44. Thus, the first output shaft 34 and second output shaft 44 are coaxially arranged. The second output shaft 44 is positioned outward of the first output shaft 34 and the motor 40 is positioned outward of the second output shaft 44.

An electromagnetic clutch 46 for enabling and disabling the transmission of the output of the motor 40 to the propeller 30 is installed below the second output shaft 44. The electromagnetic clutch 46 is equipped with a rotor 46a connected to the first output shaft 34 through a key 48, a bobbin 46b disposed near the rotor 46a and made of a resin material, a coil 46c wound on the bobbin 46b, an armature 46d disposed to face the upper surface 46a1 of the rotor 46a, and a connector 46e connected to the lower end 44a of the second output shaft 44 through a spline 50 and serving to connect the second output shaft 44 and armature 46d.

When the coil 46c of the so-structured electromagnetic clutch 46 is energized, a magnetic circuit formed among the coil 46c, rotor 46a and armature 46d produces a magnetic force that attracts the armature 46d toward the rotor 46a to bring them into connection. So energization of the coil 46c connects or couples the second output shaft 44 with the first output shaft 34 through the spline 50, connector 46e, armature 46d, rotor 46a and key 48. When the supply of current to the coil 46c is cut off, thereby de-energizing it, the connection between the armature 46d and rotor 46a is broken, thereby breaking the connection between the second output shaft 44 and first output shaft 34.

This means the motor 40 can operate as a starter motor for cranking the engine 20 if it is supplied with current when the first output shaft 34 and second output shaft 44 are interconnected by the electromagnetic clutch 46 so that the rotation of the motor 40 is transmitted through the second output shaft 44, electromagnetic clutch 46, first output shaft 34 and centrifugal clutch 36 to the crankshaft 22, thus starting the engine 20.

It also means that the motor 40 can operate as a generator capable of recovering kinetic energy generated by the engine 20 and converting it to electric energy for storage in a battery, because when not supplied with current it rotates passively driven by the rotation of the engine 20 so long as the first output shaft 34 and second output shaft 44 are connected by the electromagnetic clutch 46.

A motor case 54 is provided to continue downward from the engine cover 24 so as to enclose, among others, the motor 40, first and second output shafts 34 and 44, and the electromagnetic clutch 46.

The explanation of FIG. 1 will be continued.

The upper end 58a of a drive shaft (vertical shaft) 58 is connected to the lower end 34b of the first output shaft 34 through a spline (not shown). The drive shaft 58 is disposed vertically within a drive shaft case 60 to be rotatable around an axis extending in the gravitational direction.

A propeller shaft 64 is connected to the lower end of the drive shaft 58 through a gear mechanism 62. The gear mechanism 62 comprises a pinion gear 68 provided on the lower end of the drive shaft 58 and a bevel gear 70 provided on the end of the propeller shaft 64. When these gears mesh, the drive shaft 58 and propeller shaft 64 are interconnected.

The gear mechanism 62 and propeller shaft 64 are housed in a gear case 72 located under the drive shaft case 60 and the propeller shaft 64 is mounted inside the gear case 72 to be rotatable around a horizontal axis. The opposite end of the propeller shaft 64 from that equipped with the bevel gear 70, i.e. the rear end of the propeller shaft 64, extends out of the gear case 72 to project rearward of the outboard motor 10. The propeller 30 is attached to the projecting end. In this specification, "horizontal direction" means a direction orthogonal to the gravitational direction, and the horizontal direction looking toward the cockpit of the boat 16 from the outboard motor 10, i.e., the direction of forward travel, is defined as "forward" and the direction opposite thereof as "rearward."

The drive shaft 58 connected to the engine 20 and motor 40 serving as power sources is thus connected to the propeller 30 through the gear mechanism 62.

The output of the motor 40 is transmitted through the second output shaft 44, electromagnetic clutch 46, first output shaft 34, drive shaft 58 and gear mechanism 62 (pinion gear 68 and bevel gear 70) to the propeller shaft 64 to rotate the propeller 30, thereby producing thrust for driving the boat 16 forward or rearward.

The output of the engine 20 is transmitted through the centrifugal clutch 36 to the first output shaft 34, and then through the drive shaft 58 and gear mechanism 62 to the propeller shaft 64 to rotate the propeller 30, thereby producing thrust for driving the boat 16 forward. In other words, the propeller 30 is rotated by either or both of the output of the engine 20 and the output of the motor 40.

The outboard motor 10 is equipped with a bar handle or tiller 76 installed at an appropriate location so that its free end projects forward, i.e., toward the cockpit of the boat 16, so as to be operable by the boat operator. The drive shaft case 60 is supported by the stem brackets 14 to be rotatable around an axis extending in the gravitational direction, so that the operator can steer or maneuver the outboard motor 10 left and right by swinging the bar handle 76 laterally.

The bar handle 76 is provided at its free end with a throttle grip 78 that can be rotated by the operator and that internally incorporates a rotation angle sensor 80. The rotation angle sensor 80 produces an output or signal indicating the rotation angle (control input) of the throttle grip 78 to an electronic control unit (ECU) 82 constituted as a microcomputer. The ECU 82 controls the output of the motor 40 in response to the inputted signal, thereby regulating the speed of the boat 16.

The throttle grip 78 is connected to the throttle valve (not shown) of the engine 20 through a push-pull cable (not shown). The operator can therefore manipulate the throttle grip 78 to adjust the opening of the throttle valve, thereby controlling the speed of the engine and, by this, the speed of the boat 16.

Near the throttle grip 78 is provided a mode switch 84 which the operator can use to input instructions such as for starting and stopping the power sources (engine 20 and motor 40) and charging the battery. Signals representing the inputted instructions to start, stop, etc., are sent to the ECU 82, which controls the operation of the engine 20, motor 40 and electromagnetic clutch 46 accordingly based on the inputted signals.

In the outboard motor 10 according to the embodiment, the first output shaft 34 and second output shaft 44 are arranged coaxially in the manner explained in the foregoing, so that the amount of space required for installing the first and second output shafts 34 and 44 can be reduced in proportion to the length of their coaxial portion. As a result, the size and weight of the outboard motor 10 can be reduced, thereby enhancing its ease of operation and portability.

An outboard motor according to a second embodiment of the invention will now be explained.

Figure 3:
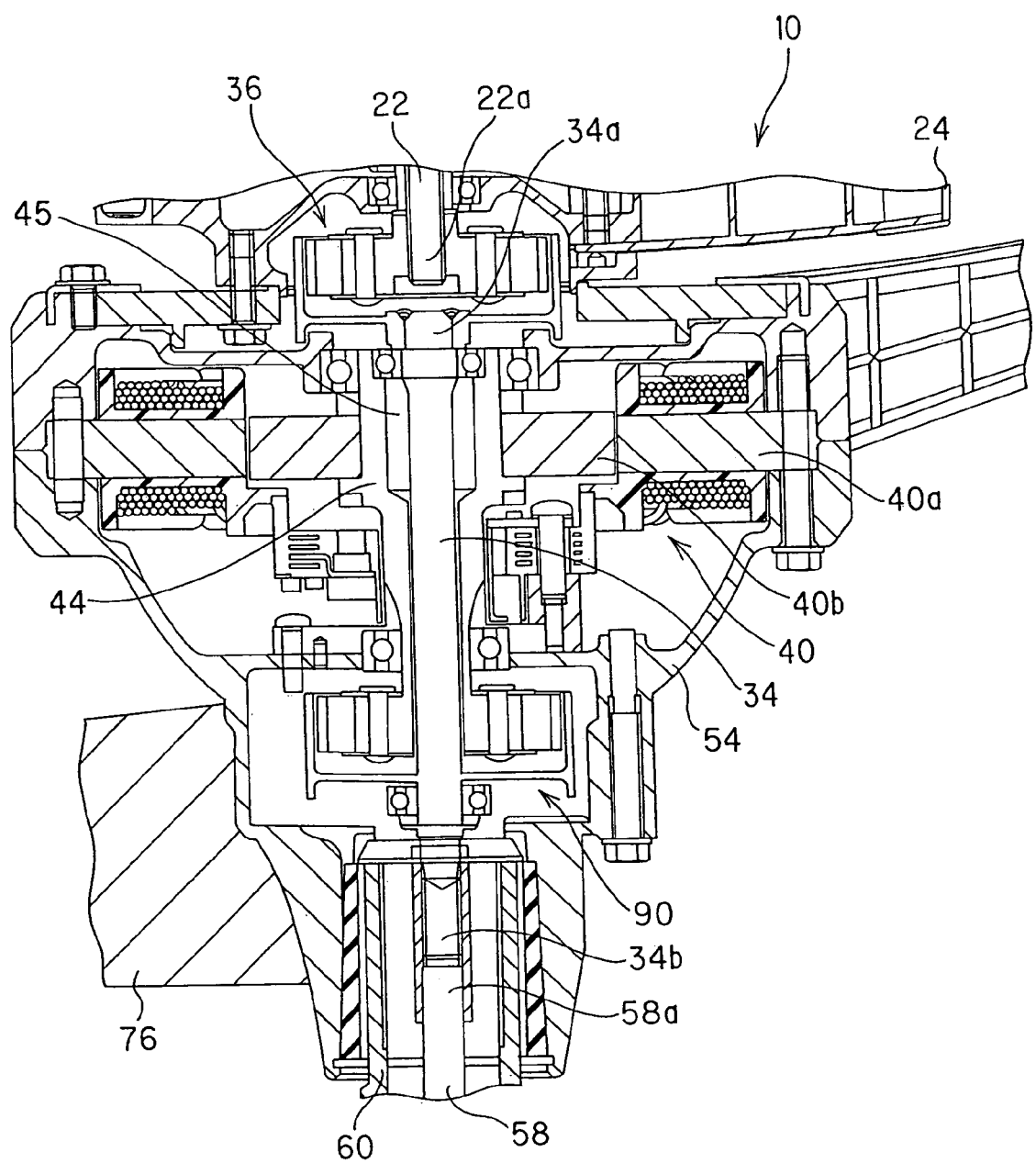
FIG. 3 is an enlarged sectional view, similar to FIG. 2, but showing the region below the crankshaft of an outboard motor according to a second embodiment of the invention.

FIG. 3 is an enlarged sectional view similar to FIG. 2 showing the region below the crankshaft 22 of the outboard motor according to the second embodiment, namely, the region of the first and second output shafts 34 and 44. In the following explanation, constituent elements corresponding to those of the first embodiment are assigned the same reference symbols as those in the first embodiment.

In the outboard motor according to the second embodiment, making and breaking of the connection between the first output shaft 34 and second output shaft 44 is performed by a second centrifugal clutch 90 instead of by the electromagnetic clutch 46 of the first embodiment. The clutch spring (not shown) of the centrifugal clutch 90 is designed to connect or couple the second output shaft 44 with the first output shaft 34 when the speed of the motor 40 exceeds a predetermined speed (e.g., 2,000 rpm).

Thus in the outboard motor according to the second embodiment, the second output shaft 44 is equipped with the second centrifugal clutch 90 capable of enabling and disabling the transmission of the output of the motor 40 to the propeller 30. Owing to this configuration, the connection between the motor 40 and the propeller 30 can be broken when the speed of the motor 40 falls below the predetermined speed, thereby preventing the motor 40 from placing an unnecessary load on the drive shaft of the propeller 30.

As explained in the foregoing, the hybrid outboard motor 10 in accordance with each of the first and second embodiments of the invention is mounted on the stern 18 of the boat 14 and is equipped with the internal combustion engine 20 and electric motor 40 as sources of power for driving the propeller 30 and are further provided with the first output shaft 34 connected to the engine for transmitting the output of the engine to the propeller 30 and the second output shaft 44 connected to the motor 40 for transmitting the output of the motor 40 to the propeller 30. In the so-configured outboard motor 10, the first output shaft 34 and second output shaft 44 are disposed coaxially, so that the amount of space required for installing the first and second output shafts 34 and 44 is smaller by the length of their coaxial portion relative to the prior art in which the first output shaft and second output shaft 34, 44 are simply connected in tandem. As a result, the size and weight of the outboard motors 10 can be reduced, thereby enhancing its ease of operation and portability.

The outboard motor 10 in accordance with each of the first and second embodiments is configured to position the second output shaft 44 outward of the first output shaft 34, so that distance or separation between the motor 40 and the second output shaft 44 can be reduced by locating the motor 40 outward of the second output shaft 44. Since it is therefore possible to establish the connection between the motor 40 and the second output shaft 44 at a shortest distance, size and weight of the outboard motor 10 can be minimized.

The outboard motor 10 in accordance with each of the first and second embodiments comprises the centrifugal clutch 36 provided on the first output shaft 34 for enabling and disabling the transmission of output of the internal combustion engine 20 to the propeller 30. The engine 20 can therefore be started by connecting the motor 40 and first output shaft 34 through the clutch and rotating the first output shaft 34 with the motor 40. This eliminates the need for a recoil starter, starter motor or the like. Moreover, the centrifugal clutch 36 can be used to disconnect the engine 20 from the propeller 30 so that the propeller 30 can be driven using the relatively low-noise motor 40.

In the outboard motor 10 according to the first embodiment, the clutch of the first output shaft 34 is constituted as the centrifugal clutch 36, so that connection between the engine 20 and the propeller 30 can be broken when the speed of the engine 20 falls below a predetermined speed (e.g., idle speed). This makes it possible to prevent the engine 20 from placing an unnecessary load on the drive shaft of the propeller 30 (more exactly, on the drive shaft 58 and propeller shaft 64).

The outboard motor 10 according to the first embodiment further comprises the electromagnetic clutch 46 provided on the second output shaft 44 for enabling and disabling transmission of the output of the motor 40 to the propeller 30. The motor 40 can therefore operate as a generator for charging the battery when the engine 20 is driving the propeller 30, because it is rotated by the engine 20 when the motor 40 and propeller 30 are connected through the electromagnetic clutch 46. In addition, the connection between the motor 40 and the propeller 30 can be broken by use of the electromagnetic clutch 46 when the motor 40 is not being used to drive the propeller 30, thereby preventing the motor 40 from placing an unnecessary load on the drive shaft of the propeller 30.

In the outboard motor 10 according to the second embodiment, the clutch of the first output shaft 34 is constituted as the centrifugal clutch 36, and the second centrifugal clutch 90 is provided on the second output shaft 44 for enabling and disabling transmission of the output of the motor 40 to the propeller 30. Owing to this configuration, connection between the engine 20 and the propeller 30 can be broken when the speed of the engine 20 falls below the predetermined speed and connection between the motor 40 and the propeller 30 can be broken when the speed of the motor 40 falls below the predetermined speed. As a result, it is possible to prevent the engine 20 or the motor 40, as the case may be, from placing an unnecessary load on the drive shaft of the propeller 30.

Although the motor 40 is exemplified as a DC brushless motor in the foregoing explanation, it can instead be any of various other types of motor.

In the foregoing embodiments, the clutch installed between the engine 20 and crankshaft 22 is a centrifugal clutch 36 but it can instead be an electromagnetic clutch or the like.

Japanese Patent Application No. 2005-261659 filed on Sep. 9, 2005, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An outboard motor mounted on a stern of a boat and having an internal combustion engine and an electric motor as selective sources of power for driving a propeller, said outboard motor comprising:
    a first output shaft connected to the engine for transmitting output of the engine to the propeller; and
    a second output shaft connected to the motor for transmitting output of the motor to the propeller, the second output shaft being disposed coaxially with the first output shaft;
        wherein the second output shaft has a hollow cylindrical space formed therein along the entire length of said shaft,
        wherein the second output shaft is positioned outward of the first output shaft, wherein a portion of the first output shaft is disposed in the hollow cylindrical space within the second output shaft,
        wherein the first and second shafts are situated in a fixed relationship to each other in the axial direction,
        and wherein the first output shaft passes through the entire length of the second output shaft.

2. The outboard motor according to claim 1, further including:
    a clutch provided on the first output shaft for selectively enabling and disabling transmission of the output of the engine to the propeller.

3. The outboard motor according to claim 1, wherein the motor operates as a starter motor for cranking the engine if the motor is supplied with current when the first output shaft and second output shaft are interconnected.

4. The outboard motor according to claim 1, wherein the motor operates as a generator capable of recovering kinetic energy generated by the engine and converting it to electric energy for storing in a battery, if the motor is not supplied with current when the first output shaft and second output shaft are interconnected.

5. An outboard motor mounted on a stern of a boat and having an internal combustion engine and an electric motor as selective sources of power for driving a propeller, said outboard motor comprising:
- a first output shaft connected to the engine for transmitting output of the engine to the propeller;
- a second output shaft connected to the motor for transmitting output of the motor to the propeller, the second output shaft being disposed coaxially with the first output shaft; and
- a clutch provided on the first output shaft for selectively enabling and disabling transmission of the output of the engine to the propeller, wherein the clutch is constituted as a centrifugal clutch, and further including:
- an electromagnetic clutch provided on the second output shaft for selectively enabling and disabling transmission of the output of the motor to the propeller.

6. An outboard motor mounted on a stem of a boat and having an internal combustion engine and an electric motor as selective sources of power for driving a propeller, said outboard motor comprising:
- a first output shaft connected to the engine for transmitting output of the engine to the propeller;
- a second output shaft connected to the motor for transmitting output of the motor to the propeller, the second output shaft being disposed coaxially with the first output shaft; and
- a clutch provided on the first output shaft for selectively enabling and disabling transmission of the output of the engine to the propeller, wherein the clutch is constituted as a centrifugal clutch, and further including:
- a second centrifugal clutch provided on the second output shaft for selectively enabling and disabling the transmission of the output of the motor to the propeller.

* * * * *